United States Patent
Sen et al.

(10) Patent No.: US 10,014,882 B2
(45) Date of Patent: Jul. 3, 2018

(54) METHOD AND APPARATUS FOR FAST PROTOTYPING OF WIRELESS TRANSCEIVERS

(75) Inventors: Robi Sen, McClean, VA (US); Ian Charles Starnes, Great Falls, VA (US); Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 162 days.

(21) Appl. No.: 13/116,984

(22) Filed: May 26, 2011

(65) Prior Publication Data

US 2011/0292976 A1    Dec. 1, 2011

Related U.S. Application Data

(60) Provisional application No. 60/286,850, filed on Apr. 26, 2001.

(51) Int. Cl.
 *H04B 1/00* (2006.01)
(52) U.S. Cl.
 CPC .................................. *H04B 1/0003* (2013.01)
(58) Field of Classification Search
 CPC .................................................... H04B 1/0003
 USPC ........ 455/550.1, 556.1, 66.1, 575.1, 73, 418
 See application file for complete search history.

(56) References Cited

U.S. PATENT DOCUMENTS

| | | | | |
|---|---|---|---|---|
| 8,391,913 | B2 * | 3/2013 | Zimmer | G06F 9/5077 375/316 |
| 9,026,790 | B2 * | 5/2015 | Bolton | H04N 21/2389 375/240.01 |
| 2004/0017824 | A1 * | 1/2004 | Koenck | G06F 1/1626 370/466 |
| 2007/0078924 | A1 * | 4/2007 | Hassan | G06F 21/125 709/200 |
| 2009/0156252 | A1 * | 6/2009 | Harris | 455/557 |
| 2010/0056200 | A1 * | 3/2010 | Tolonen | H04B 1/3805 455/552.1 |
| 2010/0185541 | A1 * | 7/2010 | Hassan | G06F 8/36 705/34 |
| 2012/0252387 | A1 * | 10/2012 | Haskins | H04B 1/0014 455/131 |
| 2013/0315211 | A1 * | 11/2013 | Balan | H04B 7/0697 370/336 |

\* cited by examiner

*Primary Examiner* — Lewis West
(74) *Attorney, Agent, or Firm* — Steven J Shattil

(57) ABSTRACT

An electronic object is configured for rapid prototyping of a wireless communication transceiver. The electronic object comprises hardware and software components. An identification module is configured for automatically conveying the electronic object's identity to at least one other electronic object in the transceiver. A signal processor performs object-specific signal processing, which is one of a plurality of component transceiver functions performed by a transceiver. An interface provides access to the electronic object's resources by other electronic objects via physical and logical entry points.

20 Claims, 12 Drawing Sheets

METHOD AND APPARATUS FOR FAST PROTOTYPING OF WIRELESS TRANSCEIVERS

CROSS-REFERENCE TO RELATED APPLICATIONS

This application claims priority under 35 U.S.C. 119(e) to U.S. Provisional Application Ser. No. 61/349,097, entitled "Method and Apparatus for Fast Prototyping of Wireless Transceivers," filed May 27, 2010.

BACKGROUND OF THE INVENTION

I. Field of the Invention

The present invention relates to rapid prototyping of electronic systems, and in particular, to systems and methods for assembling and configuring wireless transceiver components.

II. Description of the Related Art

The performance of a wireless communication network is inseparably linked to the physical layer algorithms on which it is built, the hardware used to implement the wireless links, and the wireless environment in which it operates. One major difficulty with operating a wireless network is the need to replace or redesign hardware when operating requirements change. This well-recognized need in the art has driven the development of software-defined radios in which many of the components that were typically implemented in special-purpose hardware are instead implemented in software by a general-purpose processor. The rationale behind such a design is to enable a radio to transmit and receive a variety of different wireless protocols based solely on the software used.

Many transceiver functions cannot be implemented entirely in software. For example, analog-to-digital (A/D) converters lack the discrimination to pick up sub-microvolt, nanowatt radio signals. Therefore, a low-noise amplifier (LNA) must precede the A/D converter. Since spurious signals cause an LNA to introduce distortions in the amplified signal, band-pass filters are typically used between the antenna and the LNA. This reduces the radio's flexibility, thus eliminating many of the proposed benefits of software-defined radio.

An integrated hardware and software system is required to fulfill the need for a functional, versatile, and rapid prototyping platform. This often requires that both hardware and software be developed concurrently, or else substantial hardware redesign must be considered when software is developed that cannot be supported by the current hardware. While multiple approaches are used by hardware designers to solve this problem, including computer-aided design, hardware emulation in software, and using Field Programmable Gateway Arrays (FPGAs), all these solutions have numerous draw backs, most notably being they are generally used only for prototyping until a final design is locked down.

Furthermore, there is a need in the art to provide the end-user of a wireless communication network with the ability to easily adapt, rapidly modify, and deploy wireless devices in response to changing end-user needs and network operating requirements.

SUMMARY OF THE INVENTION

Aspects of the present invention can solve these and other problems by providing an integrated hardware and software component architecture based on principles of Object Oriented Programming to allow system developers and end users to rapidly design, build, and test hardware in an iterative fashion, allowing for faster product life-cycles, greater innovation, and facilitating end-user and third-party development. In some aspects of the invention, network users and operators can rapidly build novel solutions to extend the network's functionality to serve their specific needs by simply assembling objects. In further aspects of the invention, sophisticated users can extend an object's behavior by adding their own hardware and/or software to a base object.

In traditional software development, Object-Oriented Design is a process of planning a system of interacting objects for the purpose of solving a software problem. In aspects of the invention, Object-Oriented Design principles may be applied to systems of interacting objects that comprise both hardware and software for the purpose of solving both hardware and software problems. For example, some aspects of the invention facilitate the discovery of a hardware component in a system without the need for physical device configuration or user intervention in resolving resource conflicts. A system component contains encapsulated procedures (and optionally, data) grouped together to represent an object. The object interface (i.e., how the object can be interacted with) is also defined.

With respect to aspects of the invention, Object-Oriented Design can pertain to the objects that make up a wireless device. For example, in a wireless transceiver, an object may comprise a hardware component of the transceiver, such as an RF front-end, a filter, an A/D and D/A converter, a modem, a spreader, a despreader, a MUX/DEMUX, an antenna-array processor, an error correction coder/decoder, or any combination thereof.

In one aspect of the invention, a wireless transceiver comprises a plurality of electronic objects configured for cooperatively functioning together, wherein each object is configured for performing a different transceiver function. A sub-system router may be configured for routing signals between the objects. Each object comprises a hardware component and a software component. The hardware component comprises a hardware interface for communicatively coupling to at least one other object, a central processing unit, and a memory for storing at least one of software and data. The software component comprises a software interface for allowing external access to the object's resources, and a discovery component configured for conveying the object's identity and capabilities to other objects. The discovery component may be configured for identifying other objects and their capabilities.

In another aspect of the invention, a wireless transceiver comprises a plurality of electronic objects configured for performing a similar function. For example, in one aspect of the invention, each of the plurality of electronic objects may be configured for accepting a signal formatted in accordance with a common signal format. Each of the objects performs a similar function on the input signal. For example, an object may perform error correction, equalization, demodulation, or other types of signal processing on the input signal. However, the specific operations or algorithms employed by each object may differ. In one aspect of the invention, a signal output by each of the plurality of electronic objects is formatted in accordance with a common signal format. In accordance with another aspect of the invention, the signals output by the different objects may differ with respect to one or more signal parameters. For example, although the plurality of electronic objects are configured for performing a similar function, the signals output by each object may have different symbol constellations, data rates, bit-error rates, or other signal characteristics.

In another aspect of the invention, each of the plurality of electronic objects is configured for performing a similar function, but each of the objects accepts a different signal format. An object may perform error correction, equalization, demodulation, or other types of signal processing on the input signal. However, the manner in which each object performs its function may differ based on some predetermined criterion, such as the type of signal input, the operating mode of the transceiver, or the amount of latency that can be tolerated in the system. A sub-system router may be configured for routing signals between the objects based at least on the predetermined criterion. In one aspect of the invention, the signals output by each of the plurality of electronic objects is formatted in accordance with a common signal format. In accordance with another aspect of the invention, the signals output by the different objects may differ with respect to one or more signal parameters.

In yet another aspect of the invention, an object comprises one of a plurality of components of a wireless transceiver configured to operate in a wireless sensor network. The object may comprise a component of a wireless transceiver or a sensor device configured to operate in the sensor network. For example, the object may comprise a motion-detector sensor, a heat sensor, a microphone, a camera, a thermometer, a barometer, a humidity sensor, any wireless transceiver components, or any combination thereof.

In accordance with aspects of the invention, an electronic object is configured to function as a signal-processing component in a wireless device. It is a sub-system of a stand-alone device, but not a stand-alone device in itself. While an electronic object's hardware interface may include a wireless interface, the electronic object is one of a plurality of components of a stand-alone system.

According to another aspect of the invention, an electronic object configured for rapid prototyping of a wireless communication transceiver comprises an identification means configured for automatically identifying the object's capabilities to at least one other object in the transceiver, an interface means for allowing access to the object's resources through well-defined physical and logical entry points, and a function-adaptation means configurable to extend or override functionality of another object.

According to another aspect of the invention, an electronic object configured for rapid prototyping of a wireless communication transceiver comprises an identification means, an interface means, and a polymorphism means configurable for adapting the object to perform different functions based on at least one input parameter.

As used herein, the term, rapid prototyping, is defined as constructing a device from a plurality of components configured for easy assembly. The components may include interchangeable components. A rapid-prototyping system comprises a plurality of easily assembled components that form a composite system or device.

Although particular aspects and embodiments are described herein, many variations and permutations of these embodiments fall within the scope of the invention. Although some benefits and advantages of aspects of the invention are mentioned, the scope of the invention is not intended to be limited to particular benefits, uses, or objectives. Rather, aspects of the invention are intended to be broadly applicable to different applications, system configurations, networks, and devices, some of which are illustrated by way of example in the figures and in the following description. The detailed description and drawings are merely illustrative of some aspects of the invention rather than limiting, the scope of the invention being defined by the appended claims and equivalents thereof.

BRIEF DESCRIPTION OF THE DRAWINGS

The invention is illustrated in the figures of the accompanying drawings which are meant to be exemplary and not limiting, in which like references are intended to refer to like or corresponding parts, and wherein.

DETAILED DESCRIPTION

In the following description, reference is made to the accompanying drawings that form a part hereof, and in which is shown by way of illustration specific aspects in which the invention may be practiced. It is to be understood that other aspects and embodiments may be utilized, and structural changes may be made without departing from the scope of the present invention.

Figure 1:
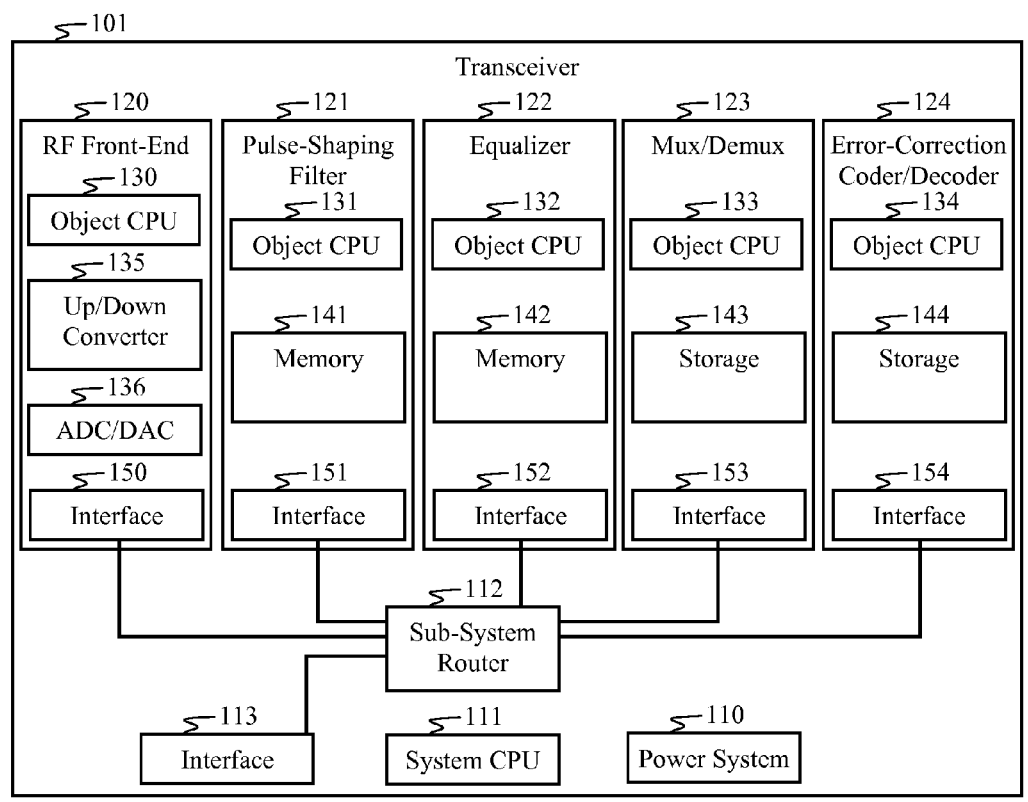
FIG. 1 is a block diagram of a wireless transceiver in accordance with one aspect of the invention.

FIG. 1 is a block diagram of a wireless transceiver 101 in accordance with an aspect of the invention. The transceiver 101 comprises a plurality of rapid-prototyping transceiver components, or objects 120-124. Each object 120-124 comprises a combination of hardware and software configured for "plug-and-play" assembly. The principle of plug-and-play, as used herein, refers to methods and aspects of the invention that facilitate the discovery of a hardware component in a system without the need for physical device configuration or user intervention in resolving resource conflicts.

Transceiver components 120-124 are referred to as objects for the purpose of relating some functional aspects of the invention to principles of Object-Oriented Design in software development. Object-Oriented Design is known in the art as a process of planning a system of interacting objects for the purpose of solving a software problem. In some aspects of the invention, Object-Oriented Design relates to systems of interacting objects that comprise both hardware and software for the purpose of solving both hardware and software problems related to communications in a wireless network and/or functional aspects of a wireless transceiver.

Each object 120-124 comprises a CPU, a storage medium for storing software, and an interface. For example, object 121, which is a pulse-shaping filter, comprises CPU 131, memory 141, and interface 151. The objects 120-124 are configurable for being easily connected to each other, such as may be useful in a rapid-prototyping application. The hardware interfaces 150-154 facilitate assembly of the objects 120-124 to produce the transceiver 101. In one aspect of the invention, the interfaces 150-154 connect the objects directly to each other. In another aspect of the invention, the interfaces 150-154 may connect to an intermediary device, such as a controller board or a router, which communicatively couples the objects 120-124 together.

Objects 120-124 may comprise additional elements. For example, the RF Front-End object 120 further comprises a frequency converter 135 for up-converting signals to be transmitted and down-converting received signals, and an ADC/DAC module 136 performs analog-to-digital conversion of received signals and digital-to-analog conversion of signals to be transmitted. Additional elements (which are not shown) may also be included, such as a power amplifier, a preamplifier, filters, and other components employed for RF front-end processing. Additional elements (which are not shown) may be included in any of the other objects 121-124.

The transceiver 101 may further comprise controller components for enabling or facilitating the operation of the objects 120-124. For example, the transceiver 101 may comprise a power system 110, a CPU 111, a router 112, and an interface 113. Other components that are not shown may also be included in the transceiver 101. In one aspect of the invention, the power system 110 provides electrical power to objects 120-124. In another aspect of the invention, one or more of the objects may include their own power source (not shown). In one aspect, the CPU 111 may be configured for processing signals employed by one or more of the objects 120-124. The CPU 111 may assist objects 120-124 in interacting with each other. The CPU 111 may process signals transmitted between the objects 120-124. In another aspect, the CPU 111 may be absent and all computer processing performed in the transceiver 101 is performed by the object CPUs 130-134. Interface 113 is also an optional component. The interface 113 may comprise a data port (not shown) for data sources and/or data sinks (not shown) that may be communicatively coupled to the transceiver 101.

Figure 2:
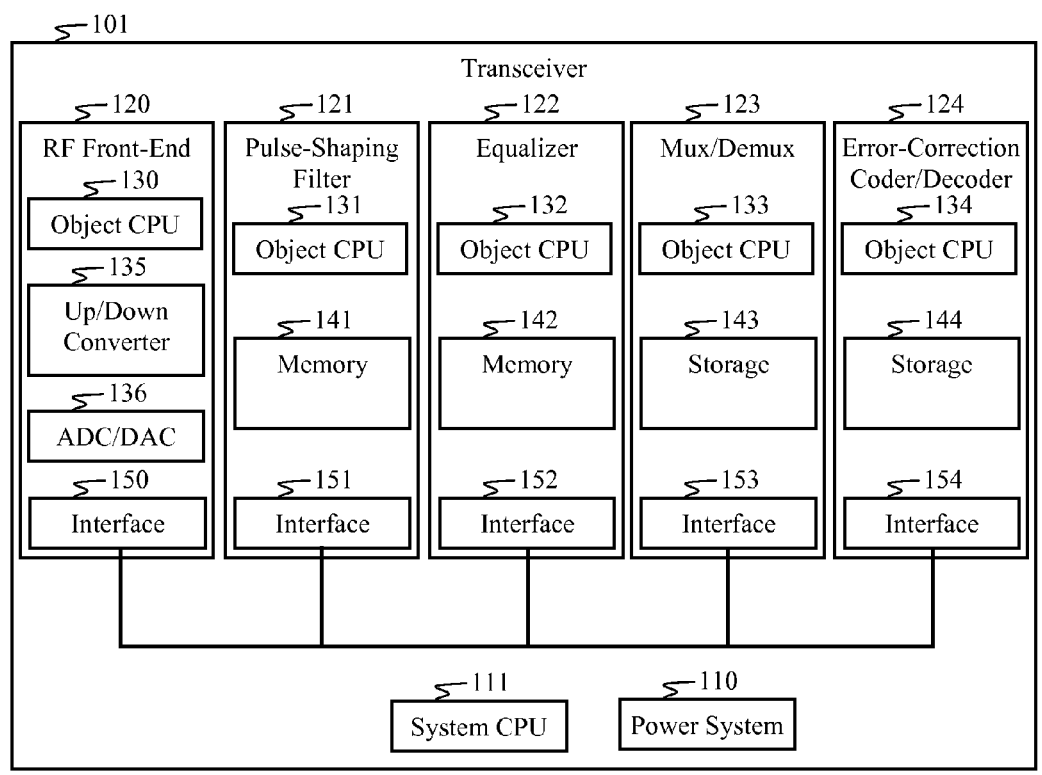
FIG. 2 is a block diagram of a wireless transceiver in accordance with another aspect of the invention.

Some aspects of the invention include methods of signal routing between the objects 120-124. Various hardware configurations may be employed for routing signals in the transceiver 101. In one aspect, the router 112 provides for routing signals between the objects 120-124. In another aspect of the invention, such as shown in FIG. 2, the transceiver 101 does not comprise a discrete router. Rather, routing functions are performed by the individual objects 120-124. In yet another aspect of the invention, one of the objects 120-124 may comprise a sub-system router (not shown) or otherwise be configurable for providing all sub-system routing.

Figure 3:
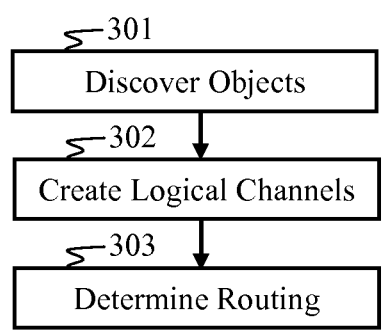
FIG. 3 is a flow diagram that depicts a method according to an aspect of the invention.

A method according to one aspect of the invention is depicted by the flow diagram shown in FIG. 3. Object discovery 301 may be performed automatically when an object is physically coupled to at least one other object or after a network of objects is assembled. Alternatively, an object discovery process 301 may be initiated by a user. Object discovery 301 comprises identifying the types of objects in the network. Object discovery 301 may further comprise collecting other information about each object. For example, object information may comprise an object's operating capabilities (e.g., memory size, processing speed, bit-error-rate performance), operating requirements (e.g., power consumption, latency), the types of signals the object is configured for processing, signal formats for signals output by the object, etc.

Logical channels between the objects are created 302 after the objects are identified in the object discovery step 301. Logical channels comprise associations between objects indicating which objects communicate with each other. These associations may further comprise the order of those communications. For example, the pulse-shaping filter 121 may communicate with the RF Front-end 120, the equalizer 122, and the Mux/Demux 123, but not with the Error-Correction Coder/Decoder 124.

Routing 303 of the signals between the objects employs the logical channels, and may optionally employ information about the signals. According to one aspect of the invention, the signal format of an output signal and/or the identification of the object transmitting the signal may be used to determine a destination object for the transmission. For example, the pulse-shaping filter 121 processes a received signal routed from the RF Front-end 120, and then the pulse-shaped received signal is routed to the equalizer 122. Since the equalizer 122 may only process received baseband signals, a signal to be transmitted is routed from the Mux/Demux 123 to the pulse-shaping filter 121, bypassing the equalizer 122. The resulting pulse-shaped signal is then routed to the RF Front-end 120.

Figure 4:
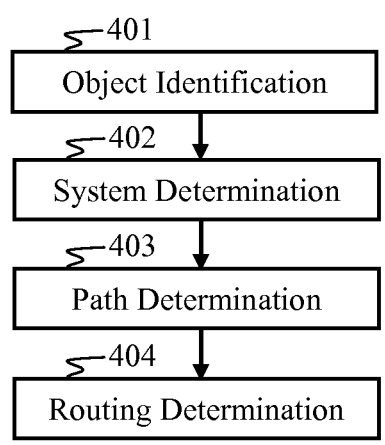
FIG. 4 is a flow diagram depicting a method for creating a network of objects in accordance with an aspect of the invention.

FIG. 4 is a flow diagram depicting a method for creating a network of objects in accordance with an aspect of the invention. For example, a system CPU 111 running network-initialization software performs object identification 401 for identifying each object. Alternatively, at least one object CPU 130-134 running network-initialization software performs object identification 401.

System determination 402 is a process whereby the CPU 111 software determines if a minimum set of objects is present to perform as a wireless transceiver 101. Alternatively, One or more object CPUs 130-134 running system determination 402 software determines if a minimum set of networked objects is present to function as a wireless transceiver 101. Object identification 401 and/or system determination 402 may be included in the Object discovery step 301 shown in FIG. 3.

Path determination 403 is a process performed by the system CPU 111 or one or more of the object CPUs 130-134 for determining which objects communicate with each other. Path determination 403 may be performed in the step of creating logical channels 302 shown in FIG. 3.

Routing determination 404 is a process whereby the system CPU 111 and/or one or more of the object CPUs 130-134 route messages between the objects 120-124. In one aspect of the invention, the system CPU 111 and/or one or more of the object CPUs 130-134 creates a routing table. Either the CPU 111 or an object 120-124 may determine at least one destination object 120-124 for an object's output signal using some predetermined criterion, such as the type of signal (e.g., signal format) and/or which object 120-124 is transmitting it. The routing step 303 shown in FIG. 3 may comprise path determination 403 and/or routing determination 404.

Figure 5:
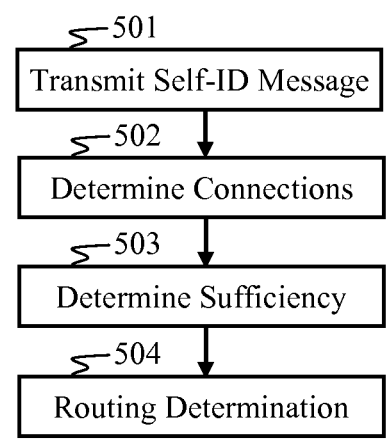
FIG. 5 is a flow diagram that depicts a method according to another aspect of the invention.

In some aspects of the invention, one or more object CPUs (such as CPUs 130-134) may perform the same functions as the system CPU 111 described with respect to FIG. 4. For example, as shown in the flow diagram depicted by FIG. 5, each object 120-124 announces its presence by transmitting a self-identification message 501. In one aspect of the invention, one or more of the objects 120-124 may transmit probing messages requesting other objects 120-124 to identify themselves.

Next, each object determines which other object(s) it connects to 502. In a packet-switched network, each object 120-124 records the address of other objects 120-124 it communicates with. Each object 120-124 may establish links with other objects 120-124 that are identified by a predetermined object type. For example, the pulse-shaping filter 121 seeks objects that are an RF Front-end type (e.g., object 120), an equalizer type (e.g., object 122), or a Mux/Demux type (e.g., object 123), and then records the addresses of those respective objects 120, 122, and 123.

In one aspect of the invention, one of the objects 120-124 functions as a network controller. The network controller may determine if a sufficient set of objects is present 503 to perform as a transceiver before proceeding to the next step. In another aspect of the invention, a plurality of the objects 120-124 may work cooperatively to perform network-control functions. According to one aspect, each object 120-124 may determine if it is able to connect to a predetermined set of objects 120-124. For example, the pulse-shaping filter 121 may search for any object that is an RF Front-End type (e.g., object 120), an equalizer type (e.g., object 122), or a Mux/Demux type (e.g., object 123). If the pulse-shaping filter 121 is unable to find another object that is an RF Front-End type (e.g., object 120), it may generate a message indicating that there is an insufficient set of objects to perform as a transceiver. If a sufficient set of objects is present, then each object 120-124 addresses its transmissions to the other objects 120-124 based on the type of signals it is transmitting. Routing determination 504 may be performed by a central network controller, or routing 504 and other network control may be performed using ad-hoc networking protocols.

In one aspect of the invention, a combined hardware and software platform is provided according to principles of Object Oriented Design whereby the hardware is componentized into objects defined by interfaces, services, and information (e.g., metadata) about each object. This enables users to rapidly build, modify, and customize wireless transceivers to their specific needs by simply assembling the objects. The object model employed in some aspects of the invention allows users to extend an object's capabilities by adding their own hardware and/or software to the object or otherwise adapting the object while preserving the object's interface.

Figure 6:
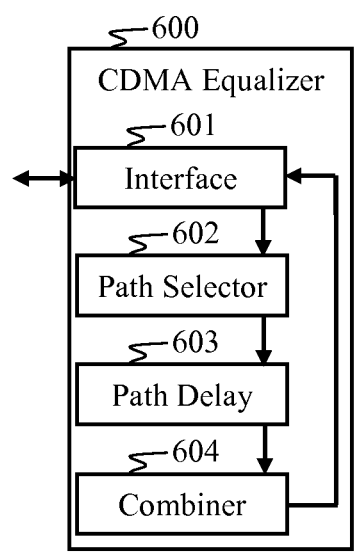
FIG. 6 is a functional diagram of a Rake equalizer object according to an aspect of the invention.

FIG. 6 is a functional diagram of a Rake equalizer object 600, which may be denoted as an equalizer object, such as the equalizer object 122 shown in FIG. 1. The equalizer object 600 is configured to equalize a received CDMA signal. The equalizer object 600 comprises an interface 601, a path selector 602, a path delay 603, and a combiner 604. Additional components that are not shown may be included in the equalizer object 600. While the equalizer object 600 may be configured to process received CDMA signals, the equalizer object 600 may be used to process other types of signals as well. In some aspects of the invention, Rake equalization may precede frequency-domain equalization.

Figure 7:
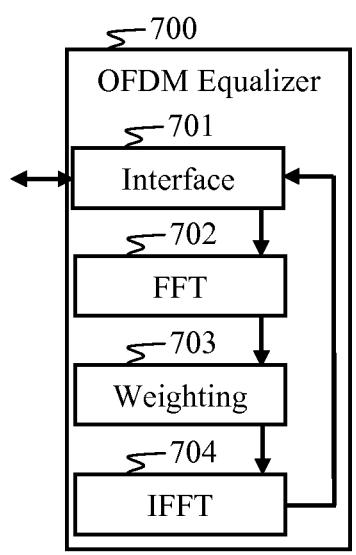
FIG. 7 is a functional diagram of a frequency-domain equalizer object according to an aspect of the invention.

FIG. 7 is a functional diagram of a frequency-domain equalizer object 700, which may be denoted as an equalizer object, such as equalizer object 122 shown in FIG. 1. The equalizer object 700 may be configured to equalize a received OFDM signal. The equalizer 700 comprises an interface 701, an FFT 702, a complex-weighting process 703, and an IFFT 704. Additional signal-processing components that are not shown may be included in the equalizer object 700. While frequency-domain equalization may be performed on a received OFDM signal, the equalizer object 700 may be configured to process other types of signals as well, such as single-carrier signals having a cyclic prefix. Furthermore, the equalizer object 700 may be configured to function with other equalizer objects. For example, frequency-domain equalization follow Rake equalization.

Figure 8:
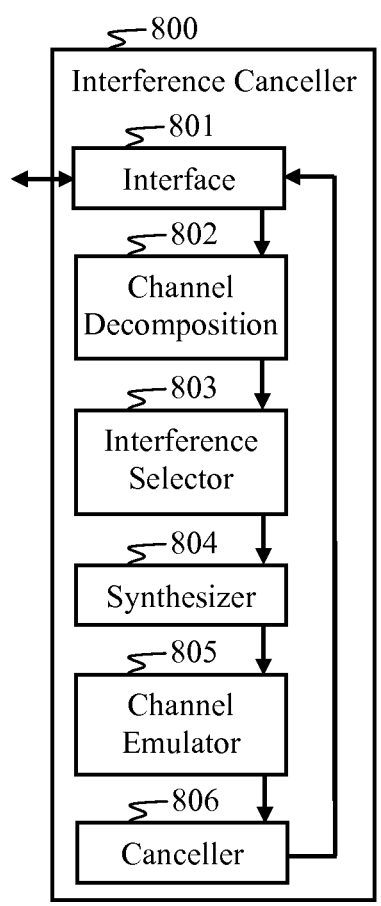
FIG. 8 is a functional diagram of an interference-canceller equalizer object according to an aspect of the invention.

FIG. 8 is a functional diagram of an interference-canceller equalizer object 800, which may be denoted as an equalizer object, such as the equalizer object 122 shown in FIG. 1. The equalizer object 800 is configured to cancel co-channel interference in a received signal. The equalizer object 800 comprises an interface 801, a channel-decomposition process 802, an interference selector 803, a synthesizer 804, a channel emulator 805, and a canceller 806. Additional components that are not shown may be included in the equalizer object 800. Interference cancellation may be performed on various types of received signals, such as CDMA signals, single-carrier signals having a cyclic prefix, and/or OFDM signals. The particular signals selected for processing by the equalizer 800 may be determined in a decision step performed by at least one object CPU (such as CPU 132) or a system CPU (such as CPU 111).

According to one aspect of the invention, interfaces 601, 701, and 801 are characterized by the same type of hardware interface and the same type of software interface. For example, the hardware interface may comprise a circuit board socket, terminal, connector, or any other connection means configured for communicatively coupling the objects 120-124 together or for communicatively coupling the objects 120-124 to a mother board, a multi-socket adaptor, or some other intermediary interface. The software interface may comprise a predetermined set of data structures, arrangement of arguments, and/or data types.

In one aspect of the invention, a data transmission addressed to an equalizer is received by a plurality of equalizer objects, such as equalizer objects 600, 700, and 800. The equalizer objects 600, 700, and 800 decide whether to process the data transmission based on an identifier value in the received transmission. The identifier value may be a preamble symbol prepended to a data packet. The identifier value may identify the type of data and/or an instruction for indicating the type of equalization to be performed. For example, the identifier value may indicate that the data is a received CDMA signal. The Rake equalizer object 600 is responsive to this identifier value for performing equalization on the data payload of the received data transmission. The frequency-domain equalizer object 700 reads the identifier value and then ignores the rest of the data transmission, since the frequency-domain equalizer object 700 is configured for processing only OFDM signals. Similarly, the interference-canceller equalizer object 800 may respond to the CDMA identifier by not processing the received signal. However, in another aspect of the invention, the interference-canceller equalizer object 800 may equalize the received CDMA signal. The transceiver 101 may further comprise signal-selection means (not shown) for selecting one of a plurality of equalized signals based on some criteria, such as a SNR or BER measurement. The transceiver 101 may further comprise signal-combining means (not shown) for combining a plurality of equalized signals.

According to one aspect of the invention, an object (such as at least one of the objects 120-124) is configurable for being responsive to a software interface parameter for adapting one or more internal functions it performs. For example, the interference-canceller equalizer object 800 may respond to a CDMA identifier value in the received data for adapting channel decomposition 802 and interference synthesis 804 functions for processing CDMA signals. Likewise, the interference-canceller equalizer object 800 may respond to an OFDM identifier value by adapting channel decomposition 802 and interference synthesis 804 functions to process OFDM signals.

According to another aspect of the invention, a signal is addressed to one or more of the objects 120-124, and the objects 120-124 perform routing. For example, an OFDM signal may be addressed to the frequency-domain equalizer object 700 and the interference-canceller equalizer object 800. When the Rake equalizer object 600 receives the OFDM signal, it may ignore the signal or retransmit the signal to the appropriate objects 700 and 800.

Figure 9:
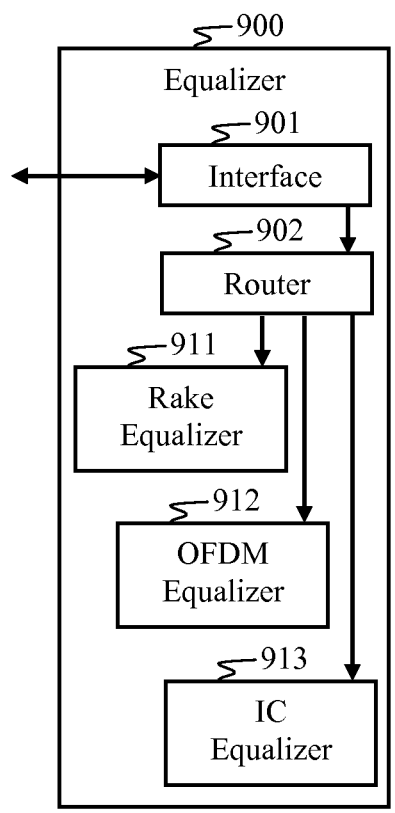
FIG. 9 is a block diagram of a compound object according to an aspect of the invention.

FIG. 9 is a block diagram of a compound object 900 according to an aspect of the invention. An object may contain other objects. For example, the compound equalizer object 900 may contain a Rake equalizer object 911, an OFDM equalizer object 912, and an interference-cancellation equalizer object 913. The objects 911, 912, 913 may comprise well-defined hardware and software interfaces (not shown) such that objects 911, 912, 913 may be replaced with other objects (not shown) having the same type of interfaces, and/or additional objects may be connected to the equalizer object 913.

According to a functional aspect of the invention, the compound equalizer object 900 is responsive to a signal received by its interface 901. An internal router 902 processes the received signal for directing it to one or more of the objects 911, 912, 913. The equalizer object 900 may be configured for selecting an equalized signal from a plurality of equalized signals. Alternatively, the equalizer object 900 may be configured for combining a plurality of equalized signals. A resulting equalized signal produced by one or more of the objects 911, 912, 913 is coupled back to the interface 901 for transmission to at least one of the other objects 120-124 in the transceiver 101.

A functional aspect of a compound object is that as changes are made to its component objects, those changes may automatically be incorporated into the compound object's properties and/or interface. For example, if the OFDM equalizer object 912 is added to the compound equalizer object 900, the equalizer 900 may adapt its software interface to accept OFDM signals, and/or the equalizer 900 may automatically inform other objects in the transceiver of its updated properties.

Figure 10:
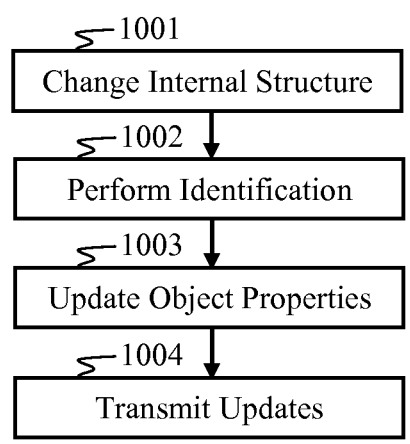
FIG. 10 is a flow diagram that depicts a method according to an aspect of the invention.

In one aspect of the invention, such as illustrated in FIG. 10, an object is added 1001 to a compound object (or some other change is made to the compound object's internal system). An identification procedure 1002 comprises an exchange of messages between at least one of the internal objects (e.g., the new object) and the compound object, which identifies the properties of the new object to the compound object. The compound object responds to the messages by updating its own properties. The compound object then transmits its updated properties to other objects 120-124 in the transceiver 101.

Although the flow diagram in FIG. 10 describes an aspect of the invention in which the steps 1001-1004 are a sequential process, in other aspects, two or more of the steps 1001-1004 may be performed in parallel or concurrently. In addition, the order of the steps 1001-1004 may be re-arranged. The process shown in FIG. 10 is terminated when its operations are completed. However, the process may comprise additional steps not shown in the figure. The process may correspond to a method, a function, a procedure, a subroutine, a subprogram, etc. When the process corresponds to a function, its termination corresponds to a return of the function to its calling function or main function.

Figure 11:
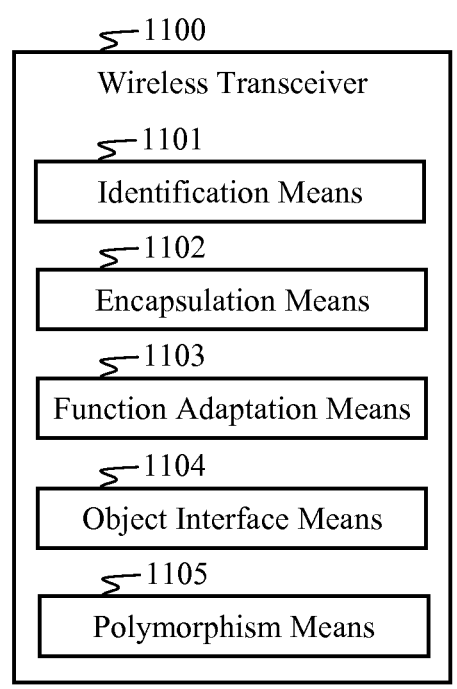
FIG. 11 is a block diagram of a wireless transceiver in accordance with aspects of the invention.

FIG. 11 is a block diagram of a wireless transceiver 1100 that comprises a plurality of objects configurable for rapid prototyping in accordance with an aspect of the invention. The wireless transceiver 1100 comprises an identification means 1101, an encapsulation means 1102, a function adaptation means 1103, an object interface means 1104, and a polymorphism means 1105.

The identification means 1101 is configured for automatically identifying the object's capabilities to at least one other object in the transceiver. Each object is defined by its properties, what it is, and what it can do (its capabilities). Its properties may comprise the type of hardware that it implements, or the properties of that hardware. For example, each object employs a CPU. Properties may include the processing speed and memory of the CPU. Signal properties may include the delay between the input and the output. What the object is can be defined by its function. For example, the object may be a modem, an error-correction coder, etc. What the object can do may be defined by either or both the nature of its inputs and its outputs. For example, an object may be defined by the rate it can process input data, or by the input signal levels it can accept. An object may be defined by characteristics of its outputs. For example, an error correction decoder may be defined by its constraint length or the bit-error rate it is capable of achieving.

According to one aspect of the invention, the identification means 1101 comprises a storage medium containing identification data corresponding to the object and software configured for transmitting the identification to other objects.

The encapsulation means 1102 is configured for hiding the object's internal structure. Each object has the capability of hiding at least some of its internal structure. For example, each object has a well-defined hardware interface and signal interface. That is, both the inputs and the outputs are well-defined. The hardware requires a signal to be delivered in a specific way (e.g., via USB, Bluetooth, Cat 5, 802.11g) and formatted in a specific way (e.g., an analog signal having a power level between a set of predetermined limits, or a digital signal having a specified data rate and/or data structure). However, the type of hardware or the path of the signals through the hardware (such as in the case where an object comprises multiple boards, or even a computer network) may be hidden if it is not pertinent to its object definition. Similarly, algorithms for processing signals inside the object may be hidden if those details are not pertinent to the object definition.

In one aspect of the invention, the encapsulation means 1102 comprises predetermined sets of input types and output types for the object's interface. This permits the internal structure of the object to be implemented in various ways without the details of the implementation being pertinent to the interfaces.

The function adaptation means 1103 is configurable to allow the object to extend or override functionality of another object. For example, in the case where two error-correction objects are employed in a system, one error-correction object may override the other error-correction object when an input signal level is above (or below) a predetermined threshold. For example, while both objects may be communicatively coupled to a network, the address of a signal configured for error correction may be dynamically selectable so the signal is routed to one or the other error-correction object based on some predetermined criterion. It is common to employ cascaded filters in digital signal processing. Therefore, an example of one object extending the function of another object can include a second filter object providing additional signal processing to the function of a first filter object. In one aspect, signals output from the first filter are routed to the second filter for subsequent processing. In another aspect, signals routed from the output of the second filter object are routed back to the first filter object, such as for performing an iterative or cascaded filtering function, until a predetermined criterion is met and the signal is re-addressed to a different destination object for further processing.

In one aspect of the invention, the function adaptation means 1103 comprises a router and software configured for routing signals to a first object when at least a first predetermined criterion is met, and routing signals to a second object of the same type as the first object when at least a second predetermined criterion is met. In another aspect of the invention, the function adaptation means 1103 comprises a router and software configured for routing signals output from a first object to a second object of the same type as the first object when a predetermined criterion is met.

The object's interface 1104 means allows access to the object's resources only through well-defined physical and logical entry points. In hardware, the object's interface is defined by its physical communication link. In order to communicatively couple two objects together, a physical-layer interface (e.g., a wired or wireless communication network) is necessary. Furthermore, a logical interface, such as an address space, may be necessary as well. In software, an interface can refer to a set of named operations that can be invoked. Interface generally refers to an abstraction that an entity provides of itself to the outside. This separates the methods of external communication from internal operations, and allows the entity to be internally modified without affecting the way outside entities interact with it. The interface may also pertain to signals, including data structures, arrangement of arguments, and data types.

The polymorphism means 1105 is configurable for adapting at least one of the objects to perform different functions based on at least one input parameter. In one aspect of the invention, an object may be configured to exhibit polymorphism. Specifically, polymorphism is the ability of one type of object or function to appear as, and be used like, another type of object or function. For example, according to one aspect of the invention, an equalizer object equalizes both CDMA and OFDM input signals. An input CDMA signal is processed by a Rake receiver, which combines different multipath components of the received signal and outputs an equalized signal. An input OFDM signal has its cyclic prefix removed and is separated into its component subcarrier values by an FFT, and then the values are weighted with respect to measured channel estimates and the resulting equalized signal is output.

Figure 12:
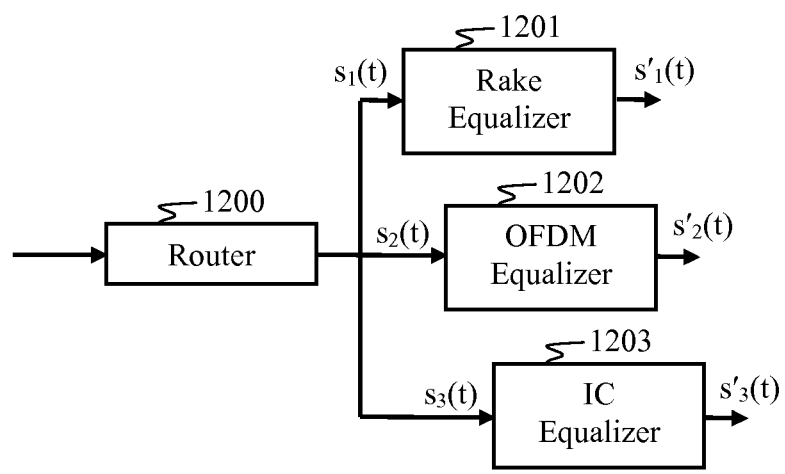
FIG. 12 is a block diagram of a set of electronic objects communicatively coupled to a router. The set of electronic objects comprise different types of equalizers.

In one aspect of the invention, a wireless transceiver comprises a plurality of electronic objects configured for performing a similar function. For example, FIG. 12 is a block diagram of a set of electronic objects 1201-1203 communicatively coupled to a router 1200. The object 1201 is a Rake equalizer having a signal input $s_1(t)$ and a signal output $s'_1(t)$. Object 1202 is an OFDM equalizer having a signal input $s_2(t)$ and a signal output $s'_2(t)$. Object 1203 is an interference canceller (IC) equalizer having a signal input $s_3(t)$ and a signal output $s'_3(t)$. In some aspects of the invention, the signal outputs $s'_1(t)$, $s'_2(t)$, and $s'_3(t)$ may be coupled back to the router 1200 or to other electronic objects (not shown).

Each of a plurality of electronic objects may be configured for accepting a signal formatted in accordance with a common signal format. Each of the objects performs a similar function on its input signal. For example, an object may perform error correction, equalization, demodulation, or other types of signal processing on the input signal. However, the specific operations or algorithms employed by each object may differ.

In FIG. 10, each object 1201-1203 is an equalizer object. Therefore, each object 1201-1203 performs equalization on its respective input signal. However, each object 1201-1203 performs a different type of equalization. In one aspect of the invention, the signal inputs $s_1(t)$, $s_2(t)$, and $s_3(t)$ comprise a common signal format. For example, a single-carrier signal with a cyclic prefix may be equalized by any of the equalizer objects 1201-1203. In some aspects, the signal inputs $s_1(t)$, $s_2(t)$, and $s_3(t)$ may comprise the same signal.

In one aspect of the invention, a signal output by each of a plurality of similar electronic objects is formatted in accordance with a common signal format. For example, the signal outputs $s'_1(t)$, $s'_2(t)$, and $s'_3(t)$ may comprise soft-decision symbol estimates quantized with respect to a predetermined symbol constellation.

In accordance with another aspect of the invention, signals output by the different objects may differ with respect to one or more signal parameters. Although a plurality of similar electronic objects are configured for performing a similar function, the signals output by each object may comprise different symbol constellations, data rates, bit-error rates, or other signal characteristics. For example, each of the signal outputs $s'_1(t)$, $s'_2(t)$, and $s'_3(t)$ may comprise symbol estimates quantized with respect to a different symbol constellation.

In another aspect of the invention, each of a plurality of electronic objects is configured for performing a similar function, but each object accepts a different signal format. An object may perform error correction, equalization, demodulation, or other types of signal processing on the input signal. However, the manner in which each object performs its function may differ based on some predetermined criterion, such as the type of signal input, the operating mode of the transceiver, or the amount of latency that can be tolerated in the system. For example, in FIG. 12, the signal inputs $s_1(t)$, $s_2(t)$, and $s_3(t)$ may comprise different signal formats, each signal format being processed by a different set of equalizer objects 1201-1203. A sub-system router, such as router 1200, may be configured for routing signals between the objects 1201-1203 based at least on one predetermined criterion. In one aspect of the invention, the output signals $s'_1(t)$, $s'_2(t)$, and $s'_3(t)$ are formatted in accordance with a common signal format. In accordance with another aspect of the invention, the signal outputs $s'_1(t)$, $s'_2(t)$, and $s'_3(t)$ may differ with respect to one or more signal parameters.

It should be understood that various aspects of the invention may be implemented in hardware, firmware, software, or combinations thereof. In such aspects, any of the steps 301-303 can be implemented in hardware, firmware, and/or software to perform the functions of the present invention. For example, the same piece of hardware, firmware, or module of software may perform one or more of the steps 301-303. Alternatively, one or more of the steps 301-303 may be performed across multiple platforms, such as in a distributed computing environment.

When implemented in software, firmware, middleware or microcode, the program code or code segments to perform the necessary tasks may be stored in a machine-readable medium such as a storage medium, or memory. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As disclosed herein, the term "computer-readable media" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant arts.

The invention claimed is:

1. A first device, comprising:
a first processor;
a communication network interface; and
a first memory including processor-executable code for a first component of a software-defined radio (SDR) that is distributed across a plurality of devices, comprising:
a set of signal processing instructions configured to perform a first physical-layer SDR algorithm corresponding to a first radio protocol; and
a set of signal processing instructions configured to cooperatively process first radio protocol signals with a second device comprising a second processor and a second memory including processor-executable code for a second component of the SDR, the second memory comprising a set of signal processing instructions configured to perform a second physical-layer SDR algorithm corresponding to the first radio protocol.

2. The first device recited in claim 1, wherein the first memory further comprises signal processing instructions configured for identifying other devices and their capabilities.

3. The first device recited in claim 1, further configured for routing signals between a plurality of devices.

4. The first device recited in claim 1, further configured for self organizing with the second device to create a communication network.

5. The first device recited in claim 1, further configured for interfacing with a controller device.

6. The first device recited in claim 1, further comprising at least one of a data source and a data sink.

7. The first device recited in claim 1, further configured for adapting its signal processing for different signal inputs.

8. The first device recited in claim 1, comprising a plurality of devices.

9. The first device recited in claim 1, further configured to write software.

10. The first device recited in claim 1, further configured to update its identity upon updates to its set of signal processing instructions.

11. A wireless transceiver comprising a plurality of devices, each device comprising:
a processor;
a communication network interface; and
a memory
including processor-executable code for one software component of a software-defined radio (SDR) that is distributed across a plurality of devices, comprising:
a set of signal processing instructions configured to perform a physical-layer SDR algorithm corresponding to a first radio protocol; and
a set of signal processing instructions configured to cooperatively process first radio protocol signals with an other device comprising an other processor and an other memory including processor-executable code for an other component of the SDR, the other memory comprising a set of signal processing instructions configured to perform an other physical-layer SDR algorithm processing corresponding to the first radio protocol.

12. The wireless transceiver recited in claim 11, further comprising a router configured for routing signals between the plurality of devices.

13. The wireless transceiver recited in claim 11, wherein at least one of the plurality of devices is configured for routing signals between the plurality of devices.

14. The wireless transceiver recited in claim 11, wherein the plurality of devices is configured for self organizing to create a communication network.

15. The wireless transceiver recited in claim 11, wherein each device is configured for interfacing with a controller device.

16. The wireless transceiver recited in claim 11, comprising a second plurality of devices configured for performing similar signal processing on different signals.

17. A device configured for rapid prototyping of a wireless transceiver, comprising:
an identification means configured for automatically conveying the device's identity to at least one other device;
a signal-processing means comprising a processor and a non-transitory computer-readable medium comprising first signal processing instructions of a software-defined radio (SDR) that is distributed across a plurality of devices, comprising:
a set of signal processing instructions configured to perform a first physical-layer SDR algorithm corresponding to a first radio protocol; and
a set of signal processing instructions configured to cooperatively process first radio protocol signals with a second device comprising a second processor and a second memory including processor-executable code for a second component of the SDR, the second memory comprising a set of signal processing instructions configured to perform a second physical-layer SDR algorithm corresponding to the first radio protocol.

18. The device recited in claim 17, further comprising a function adaptation means configurable to perform at least one of extending and overriding functionality of another device.

19. The device recited in claim 17, further comprising a polymorphism means configurable for adapting the signal processing means to perform different functions based on at least one input parameter.

20. A method for assembling a wireless transceiver, the method comprising:
- communicatively coupling together a plurality of devices, each of the plurality of devices comprising:
  - a processor;
  - a communication interface; and
  - a memory including processor-executable code for a first component of a software-defined radio (SDR) that is distributed across the plurality of devices;
- providing each of the plurality of devices with a set of signal processing instructions for performing a different one of a plurality of physical-layer SDR algorithms corresponding to a first radio protocol; and
- coordinating the plurality of devices to cooperatively process the first radio protocol signals.

* * * * *

UNITED STATES PATENT AND TRADEMARK OFFICE
CERTIFICATE OF CORRECTION

PATENT NO.         : 10,014,882 B2                                          Page 1 of 1
APPLICATION NO.    : 13/116984
DATED              : July 3, 2018
INVENTOR(S)        : Robi Sen, Ian Charles Starnes and Steve Shattil It is certified that error appears in the above-identified patent and that said Letters Patent is hereby corrected as shown below:

In the Specification

Column 1, Lines 8-11; cancel the text beginning with "This application is" and ending "filed May 27, 2010." and insert the following:
--This application is a Continuation-in-Part of U.S. Pat. Appl. No. 12/328,917, filed December 05, 2008, now U.S. Pat. No. 7,965,761, which is a Divisional of U.S. Pat. Appl. No. 11/621,014, filed January 8, 2007, now U.S. Pat. No. 7,593,449, which is a Divisional of U.S. Pat. Appl. No. 10/131,163, filed April 24, 2002, now U.S. Pat. No. 7,430,257; and this application claims priority under 35 U.S.C. 119(e) to U.S. Provisional Application Ser. No. 61/349,097, entitled "Method and Apparatus for Fast Prototyping of Wireless Transceivers.--

Signed and Sealed this
Fourteenth Day of July, 2020

Andrei Iancu
*Director of the United States Patent and Trademark Office*